(12) United States Patent
Kurth

(10) Patent No.: US 10,132,395 B2
(45) Date of Patent: Nov. 20, 2018

(54) DRIVING ASSEMBLY COMPRISING A ROLLING DIFFERENTIAL

(71) Applicant: Schaeffler Technologies AG & Co. KG, Herzogenaurach (DE)

(72) Inventor: Franz Kurth, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/313,750

(22) PCT Filed: Jun. 12, 2015

(86) PCT No.: PCT/DE2015/200360
§ 371 (c)(1),
(2) Date: Nov. 23, 2016

(87) PCT Pub. No.: WO2016/004937
PCT Pub. Date: Jan. 14, 2016

(65) Prior Publication Data
US 2017/0198792 A1    Jul. 13, 2017

(30) Foreign Application Priority Data
Jul. 7, 2014   (DE) .................. 10 2014 213 146

(51) Int. Cl.
*F16H 37/08* (2006.01)
*B60K 1/00* (2006.01)
*B60K 17/16* (2006.01)
*F16H 48/10* (2012.01)

(52) U.S. Cl.
CPC .......... *F16H 37/0813* (2013.01); *B60K 1/00* (2013.01); *B60K 17/165* (2013.01); *F16H 48/10* (2013.01); *B60K 2001/001* (2013.01)

(58) Field of Classification Search
CPC .................................................. F16H 37/0813
See application file for complete search history.

(56) References Cited

U.S. PATENT DOCUMENTS

| 4,249,631 | A  | * | 2/1981 | Huneke ............... | B60G 9/02 180/255 |
| 5,919,109 | A  |   | 7/1999 | Fleckenstein | |
| 6,258,002 | B1 |   | 7/2001 | Lippitsch | |
| 6,398,685 | B1 | * | 6/2002 | Wachauer ............ | B60K 1/00 180/65.6 |
| 8,439,786 | B2 |   | 5/2013 | Anspann et al. | |

(Continued)

FOREIGN PATENT DOCUMENTS

| CN | 87208976 U | 4/1988 |
| CN | 2060831 U | 8/1990 |

(Continued)

*Primary Examiner* — Jacob S. Scott
*Assistant Examiner* — Timothy Hannon
(74) *Attorney, Agent, or Firm* — Volpe and Koenig, P.C.

(57) ABSTRACT

The invention relates to a driving assembly for a vehicle, including an electric machine and a transmission device that is connected thereto, further having a differential and a spur gear that drivingly couple a first output shaft and a second output shaft to the electric machine. According to the invention, the differential is embodied as a rolling differential; the first output shaft is drivingly connected to the rolling differential, and the second output shaft is drivingly connected to the spur gear.

6 Claims, 1 Drawing Sheet

(56) References Cited

U.S. PATENT DOCUMENTS

| | | | | |
|---|---|---|---|---|
| 2003/0203782 | A1* | 10/2003 | Casey | B60K 1/00 475/150 |
| 2007/0087886 | A1* | 4/2007 | Rosemeier | B60K 17/344 475/6 |
| 2008/0035405 | A1* | 2/2008 | Oberhausen | B60K 17/16 180/245 |
| 2009/0211824 | A1* | 8/2009 | Knoblauch | B60K 1/00 180/65.7 |
| 2010/0261566 | A1 | 10/2010 | Anspann et al. | |
| 2012/0080247 | A1* | 4/2012 | Schmid | A61G 5/04 180/65.1 |
| 2012/0302388 | A1* | 11/2012 | Scekic | F03D 11/02 475/31 |
| 2013/0123057 | A1* | 5/2013 | Markl | B60K 1/00 475/150 |
| 2014/0262588 | A1* | 9/2014 | Bruns | B60K 1/00 180/291 |
| 2014/0374185 | A1* | 12/2014 | Fischer | B60K 6/52 180/253 |
| 2015/0021109 | A1* | 1/2015 | Knoblauch | B60K 1/02 180/65.1 |
| 2015/0226297 | A1* | 8/2015 | Knoblauch | B60L 15/2054 475/150 |
| 2016/0201762 | A1* | 7/2016 | Chen | H02K 7/116 74/325 |

FOREIGN PATENT DOCUMENTS

| | | |
|---|---|---|
| DE | 19741207 | 4/1998 |
| DE | 102006038358 | 2/2008 |
| DE | 102007055767 | 6/2009 |
| DE | 102011102749 | 11/2012 |
| DE | 102013218502 | 3/2015 |
| DE | 102013226073 | 6/2015 |
| EP | 2336601 | 6/2011 |
| FR | 2436293 | 4/1980 |
| GB | 2031077 | 4/1980 |
| JP | H09166198 | 6/1997 |
| WO | 9901310 | 1/1999 |

* cited by examiner

DRIVING ASSEMBLY COMPRISING A ROLLING DIFFERENTIAL

BACKGROUND

The invention relates to a drive arrangement for a vehicle with an electric machine and a transmission device connected to this electric machine, comprising a differential and a spur gear that provide a drive connection of a first and a second driven shaft with the electric machine.

FIELD OF THE INVENTION

DE 10 2007 055 767 A1 discloses an electric drive for a vehicle with an electric motor that drives two outputs via a spur gear transmission and a differential gear unit. In particular, the electric motor drives, with its motor shaft, a first spur gear that is in active connection with a second spur gear that is locked in rotation via an intermediate shaft with a third spur gear. The third spur gear is in active connection with a fourth spur gear that is locked in rotation with a differential cage of the differential gear unit. Thus, the spur gear transmission has, in total, four spur gears.

The disadvantage of the previously mentioned prior art consists in that the transmission arrangement, in particular, the spur gear transmission has many transmission parts, in particular, spur gears. Therefore, the entire transmission arrangement requires a relatively large amount of installation space. Furthermore, due to the four spur gears, the efficiency of the transmission is lowered and the weight is increased.

SUMMARY

Therefore, the objective of the present invention is to create a drive arrangement with a differential and a spur gear that has a compact construction and is optimized with respect to weight and has a high efficiency.

According to the invention, the differential is constructed as a rolling differential, wherein the first driven shaft is in drive connection with the rolling differential and the second driven shaft is in drive connection with the spur gear. A wheel for driving the vehicle is arranged at least indirectly on each of the two driven shafts. Thus, the first driven shaft represents a first power take-off and the second driven shaft represents a second power take-off of the drive arrangement.

The electric machine is preferably in drive connection with the rolling differential via a sun shaft. The sun shaft is advantageously connected directly to the electric machine. Furthermore, however, the sun shaft can also have a two-part construction. In particular, an electric motor, comprising a rotor and a stator, is used as the electric machine.

In an especially preferred way, the sun shaft meshes with a planet set supported on a planet carrier so that it can rotate. In particular, the planet set meshes radially between the sun shaft and a ring gear. In other words, the rolling differential comprises the sun shaft acting as power intake and the planet set that is supported on the planet carrier so that it can rotate and that is arranged radially between the sun shaft and the fing gear. Therefore, the rolling differential has an especially compact construction.

In addition, the planet carrier is preferably coupled with the first driven shaft. Consequently, the planet carrier is used as a first power take-off of the rolling differential.

The invention includes the technical teaching that the ring gear has external teeth and meshes with the spur gear. Thus, the ring gear meshes both with the planet set of the rolling differential and also with the spur gear. Here, the ring gear represents a second power take-off of the rolling differential.

According to a preferred embodiment, the first and the second driven shafts are arranged parallel and have an axial offset. In other words, the two driven shafts are not located on a common axis, but instead at a radial distance from each other. This produces, in particular, savings with respect to installation space in the axial direction of the driven shafts.

Preferably, the axial offset of the two driven shafts can be offset by an articulated shaft connected to each of the first and second driven shafts. Thus, the two articulated shafts allow the compensation of the axial offset under the use of simple and compact components. Also conceivable is, for example, the use of constant-velocity joints or the like for compensating the axial offset.

According to another preferred embodiment, the first and second driven shafts are arranged on a common axis, wherein at least the transmission device has an angle of rotation that is between 10° and 80° with regard to the common axis of the two driven shafts. In other words, at least the transmission device is rotated by the angle of rotation, so that the two driven shafts are arranged on a common axis due to this rotation. Therefore, the previously mentioned articulated shafts for compensating the axial offset are eliminated. Furthermore, it is also conceivable to rotate the electric machine, in addition to the transmission device, by the angle of rotation, so that the entire drive arrangement is rotated up to the two driven shafts. An angle of rotation of 0° here represents the transverse installation of the drive arrangement in the vehicle, wherein an angle of rotation of 90° represents a longitudinal installation of the drive arrangement in the vehicle.

In an especially preferred way, the angle of rotation is between 30° and 60° with respect to the common axis of the two driven shafts. In particular, the angle of rotation is between 40° and 50° with respect to the common axis of the two driven shafts.

BRIEF DESCRIPTION OF THE DRAWINGS

Additional measures improving the invention are shown in more detail below together with the description of preferred embodiments of the invention with reference to the figures. Shown are.

DETAILED DESCRIPTION OF THE PREFERRED EMBODIMENTS

Figure 1:
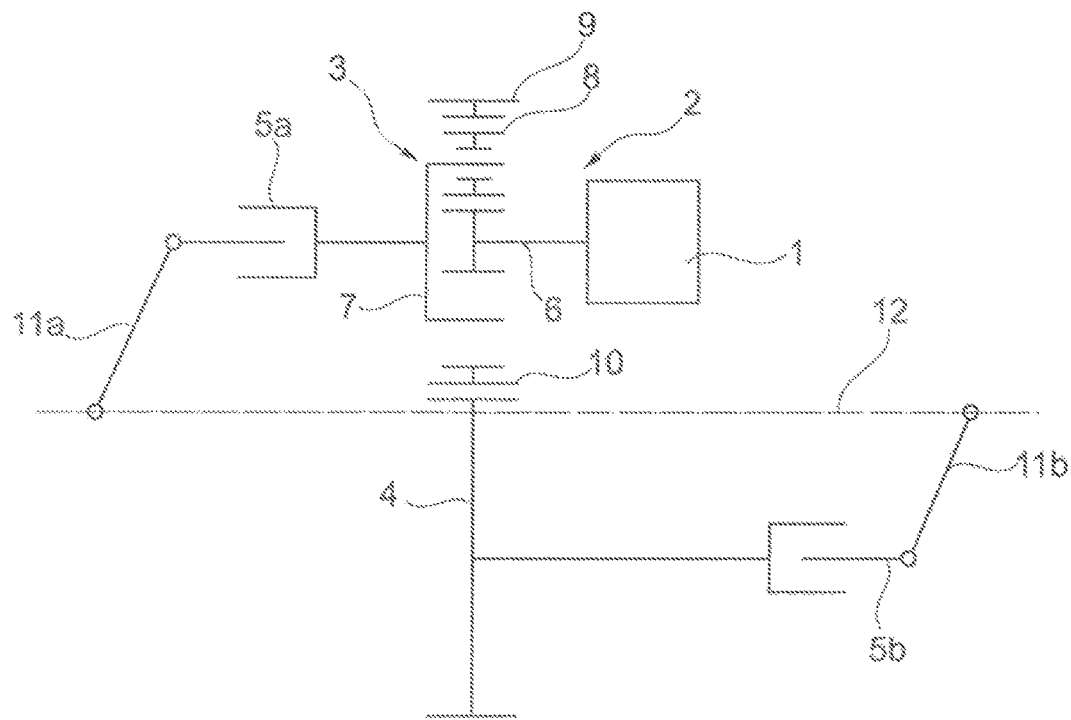
FIG. 1 a schematic diagram for showing the layout of a drive arrangement according to the invention according to a first embodiment, and FIG. 2 a schematic diagram for showing the layout of a drive arrangement according to the invention according to a second embodiment.
Figure 2:
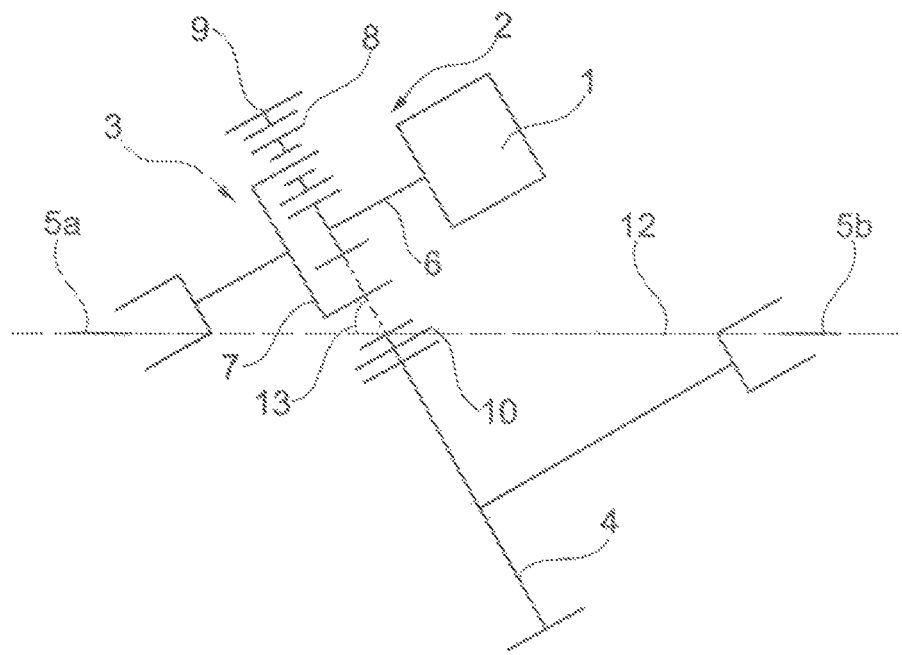

According to FIGS. 1 and 2, a drive arrangement according to the invention for a vehicle has an electric machine 1 and a transmission device 2 connected to this electric machine. The transmission device 2 includes a rolling differential 3 and a spur gear 4, wherein the rolling differential 3 interacts in a driving manner via a planet carrier 7 with a first driven shaft 5a and the spur gear 4 interacts in a driving manner with a second driven shaft 5b. A sun shaft 6 connects the electric machine 1 to the rolling differential 3 and thus represents a power input of the rolling differential 3. The sun shaft 6 here meshes with a planet set 8 that is supported on the planet carrier 7 so that it can rotate and that meshes with a ring gear 9 on its side. The ring gear 9 further has external teeth 10 and meshes via these teeth with the spur gear 4. The drive arrangement thus allows a power distribution in the rolling differential 3 that is constructed as a planetary gear and a high transmission ratio with a high efficiency.

According to FIG. 1, the first and the second driven shafts 5a, 5b are arranged parallel and have an axial offset. The axial offset of the two driven shafts 5a, 5b, however, is compensated by an articulated shaft 11a, 11b that is connected to each of the first and second driven shafts 5a, 5b. The two articulated shafts 11a, 11b connect the two driven shafts 5a, 5b with a wheel of the vehicle arranged on a common axis 12—not shown here.

According to FIG. 2, the first and second driven shafts 5a, 5b are arranged on a common axis 12, wherein the transmission device 2 and the electric machine 1 have an angle of rotation 13 that is 50° with respect to the common axis 12 of the two driven shafts 5a, 5b. The two driven shafts 5a, 5b are each connected to a wheel of the vehicle—not shown here.

LIST OF REFERENCE NUMBERS

1 Electric machine
2 Transmission device
3 Differential
4 Spur gear
5a, 5b Driven shaft
6 Sun shaft
7 Planet carrier
8 Planet set
9 Ring gear
10 External teeth
11a, 11b Articulated shaft
12 Axis
13 Angle of rotation

The invention claimed is:

1. A drive arrangement for a vehicle with an electric machine and a transmission device connected to said electric machine, comprising a differential and a spur gear that drivingly couple a first driven shaft and a second driven shaft with the electric machine, the differential is constructed as a rolling differential, the first driven shaft is drive connected with the rolling differential and the second driven shaft is drive connected with the spur gear, wherein the first and second driven shafts are arranged parallel to each other and have an axial offset relative to each other, and the axial offset of the first and second driven shafts is compensated by an articulated shaft connected to each of first and the second driven shafts.

2. The drive arrangement according to claim 1, wherein the electric machine is drive connected with the rolling differential via a sun shaft.

3. The drive arrangement according to claim 2, wherein the sun shaft meshes with a planet set supported on a planet carrier for rotation.

4. The drive arrangement according to claim 3, wherein the planet carrier is coupled with the first driven shaft.

5. The drive arrangement according to claim 3, wherein the planet set meshes radially between the sun shaft and a ring gear.

6. The drive arrangement according to claim 5, wherein the ring gear has external teeth and meshes with the spur gear.

* * * * *